United States Patent
Zeh et al.

(10) Patent No.: US 12,526,153 B2
(45) Date of Patent: Jan. 13, 2026

(54) NONCE PREPROCESSING FOR A SECURITY SCHEME

(71) Applicant: Infineon Technologies AG, Neubiberg (DE)

(72) Inventors: Alexander Zeh, Munich (DE); Florian Mendel, Munich (DE); Martin Schläffer, Zell am See (AT)

(73) Assignee: Infineon Technologies AG, Neubiberg (DE)

( * ) Notice: Subject to any disclaimer, the term of this patent is extended or adjusted under 35 U.S.C. 154(b) by 334 days.

(21) Appl. No.: 18/304,105

(22) Filed: Apr. 20, 2023

(65) Prior Publication Data
US 2024/0356754 A1   Oct. 24, 2024

(51) Int. Cl.
*H04L 9/06* (2006.01)
*H04L 9/14* (2006.01)
*H04L 9/32* (2006.01)

(52) U.S. Cl.
CPC .............. *H04L 9/3242* (2013.01); *H04L 9/14* (2013.01); *H04L 9/0637* (2013.01)

(58) Field of Classification Search
CPC ........ H04L 9/3242; H04L 9/14; H04L 9/0637
See application file for complete search history.

(56) References Cited

U.S. PATENT DOCUMENTS

| | | | | |
|---|---|---|---|---|
| 2014/0301546 A1* | 10/2014 | Chevallier-Mames | | H04L 9/0637 380/28 |
| 2020/0008041 A1* | 1/2020 | Zhang | ................. | H04W 12/08 |
| 2020/0052892 A1* | 2/2020 | Chhabra | ................ | H04L 9/0631 |
| 2020/0296099 A1* | 9/2020 | Shanbhogue | ......... | H04L 9/0631 |
| 2021/0297243 A1* | 9/2021 | Ghosh | ................... | H04L 9/0631 |
| 2021/0319143 A1* | 10/2021 | Chhabra | ................ | H04L 9/3242 |
| 2022/0066741 A1* | 3/2022 | Saarinen | ................. | G06F 21/72 |

OTHER PUBLICATIONS

Dobraunig, C. et al., "Ascon Lightweight Authenticated Encryption & Hashing," https://ascon.iaik.tugraz.at/index.html; Graz University of Technology, Infineon Technologies, Intel Labs, Lamarr Security Research, and Radboud University; 2021, 22 pages.

Dobraunig, C. et al., "Ascon v1.2 Submission to the CAESAR Competition," Institute for Applied Information Processing and Communications and Infineon Technologies Austria AG; http://ascon.iaik.tugraz.at; Sep. 15, 2016, 27 pages.

\* cited by examiner

*Primary Examiner* — David J Pearson
(74) *Attorney, Agent, or Firm* — Harrity & Harrity, LLP

(57) ABSTRACT

A device may compute a cryptographic state based on a freshness value. The device may compute a successive cryptographic state based on a successive freshness value. The successive freshness value may be based on a freshness modifier in combination with the freshness value. The device may store the cryptographic state and the successive cryptographic state. The device may receive a message after the cryptographic state and the successive cryptographic state are stored. The device may identify the cryptographic state or the successive cryptographic state based on the freshness value or the successive freshness value. The device may perform a security operation based on the cryptographic state or the successive cryptographic state.

20 Claims, 10 Drawing Sheets

NONCE PREPROCESSING FOR A SECURITY SCHEME

BACKGROUND

Symmetric cryptography is a technique that uses a single shared secret (herein referred to as a key) to enable encrypted data to be exchanged between a transmitter and a receiver. The same key is used by both the transmitter (e.g., to encrypt data) and the receiver (e.g., to decrypt the encrypted data). Symmetric encryption is a two-way process. For example, with a block of plaintext and a given key, a symmetric cipher will always generate the same ciphertext. Likewise, using that same key on that block of ciphertext will always produce the original plaintext.

Authenticated encryption (AE) is a security scheme that uses symmetric cryptography to provide confidentiality and authenticity of data. AE with additional data (AEAD) is an example of an AE variant that provides confidentiality and authenticity of data, as well as authentication (but not encryption) of additional data, such as header data. In general, AEAD aims to provide confidentiality, authenticity, and integrity for a message consisting of plaintext and additional data (also referred to as associated data or additional authenticated data) based on the use of a message authentication code (MAC) (sometimes referred to as a tag) to confirm that encrypted data is authentic. Authentication only (AO) is a security scheme that provides authenticity of data. An AO scheme can be used, for example, to detect whether a message carrying data that has not been encrypted has been altered. Notably, an AO scheme does not provide confidentiality since encryption and decryption are not utilized. A security scheme such as AE, AEAD, or AO may be used in, for example, an automotive application, where functional safety, real-time constraints, reusability, cost, flexibility, strong/robust security, and energy consumption play an important role.

SUMMARY

In some implementations, a device includes one or more components to: compute a cryptographic state based on a freshness value; compute a successive cryptographic state based on a successive freshness value, the successive freshness value being based on a freshness modifier in combination with the freshness value; store the cryptographic state and the successive cryptographic state; receive a message after the cryptographic state and the successive cryptographic state are stored; identify the cryptographic state or the successive cryptographic state based on the freshness value or the successive freshness value; and perform a security operation based on the cryptographic state or the successive cryptographic state.

In some implementations, a device includes one or more components to: compute a cryptographic state based on a freshness value; compute a successive cryptographic state based on a successive freshness value using a freshness modifier in combination with the freshness value; store the cryptographic state and the successive cryptographic state; receive an indication to generate a message after the cryptographic state and the successive cryptographic state are stored; identify the cryptographic state or the successive cryptographic state based on the freshness value or the successive freshness value; generate the message based on the cryptographic state or the successive cryptographic state; and transmit the message.

In some implementations, a method includes computing, by a device, a plurality of cryptographic states based on a plurality of freshness values, wherein the plurality of freshness values includes a first freshness value and a second freshness value that is successive to the first freshness value; storing, by the device, the plurality of cryptographic states; identifying, by the device, a cryptographic state of the plurality of cryptographic states based on a particular freshness value being associated with a message; and processing, by the device, the message based on the identified cryptographic state.

DETAILED DESCRIPTION

Figure 1A:
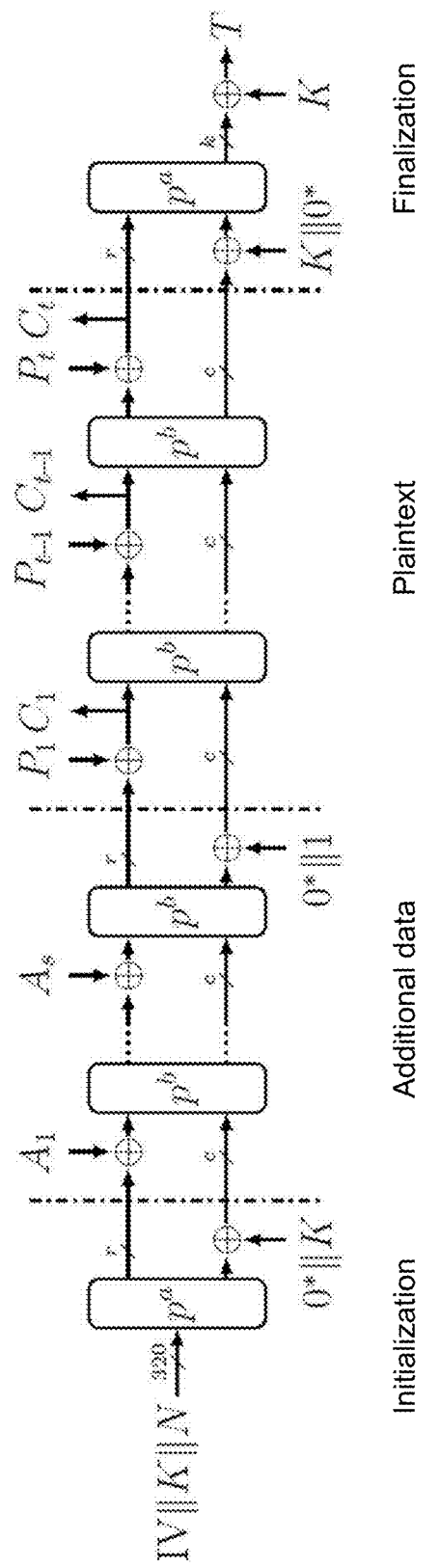
FIGS. 1A and 1B illustrate examples of encryption operations and decryption operations, respectively, of the Ascon algorithm.

The following detailed description of example implementations refers to the accompanying drawings. The same reference numbers in different drawings may identify the same or similar elements.

A security scheme that utilizes symmetric cryptography, such as authenticated encryption (AE), AE with additional data (AEAD), or authentication only (AO), may utilize a lightweight cryptographic algorithm. Lightweight cryptography aims to deploy a cryptographic algorithm in resource-constrained devices such as in embedded systems, radio frequency identification (RFID) devices, automotive networks, or sensor networks, among other examples. The lightweight-ness of a given cryptographic algorithm can be obtained by, for example, optimizing implementations with respect to different constraints or by designing the algorithm to use smaller key sizes, smaller internal states, smaller building blocks, simpler rounds, simpler key schedules, or the like. Relevant metrics for assessing lightweight cryptographic algorithms include, for example, power consumption, energy consumption, latency, throughput, or resource requirements. The importance of a given metric may depend on the application. For example, power consumption and energy consumption may be important for an application in which a device is battery-oriented or configured to perform energy harvesting. As another example, latency and throughput may be important for an application where fast response time is necessary, such as an automotive application (e.g., an Advanced Driver Assistance System).

Ascon is one example of a family of authenticated encryption and hashing algorithms that are designed to be lightweight and easy to implement. Ascon is parametrized by a key length k (e.g., k≤128 bits), a rate r, and internal round numbers a and b. An Ascon design specifies an authenticated encryption algorithm $E_{a,b,k,r}$ and a decryption algorithm $D_{a,b,k,r}$. Inputs for the authenticated encryption algorithm $E_{a,b,k,r}$ are a plaintext P, additional data A, a key K of size k bits, a number used once (referred to as a nonce) N of k bits, and an initialization vector IV. An output of the authenticated encryption procedure is an authenticated ciphertext C of the same length as the plaintext P and an authentication tag T (i.e., a message authentication code (MAC)) of size k bits which authenticates both the additional data A and the plaintext P:

$$E_{a,b,k,r}(K,N,A,P)=(C,T)$$

The decryption and verification algorithm $D_{a,b,k,r}$ takes as input the key K, the nonce N, the initialization vector IV, the additional data A, the ciphertext C, and the tag T, and outputs the plaintext P if verification of the tag T passes or, alternatively, outputs a ⊥ (i.e., false) result if the verification of the tag T fails:

$$D_{a,b,k,r}(K,N,A,C,T) \in \{P, \perp\}$$

Tunable parameters of an Ascon design include the key size k, the rate r, the number of rounds a for initialization and finalization permutations $p^a$, and the number of rounds b for intermediate permutations $p^b$ associated with processing of the additional data A and the plaintext P.

Figure 1B:
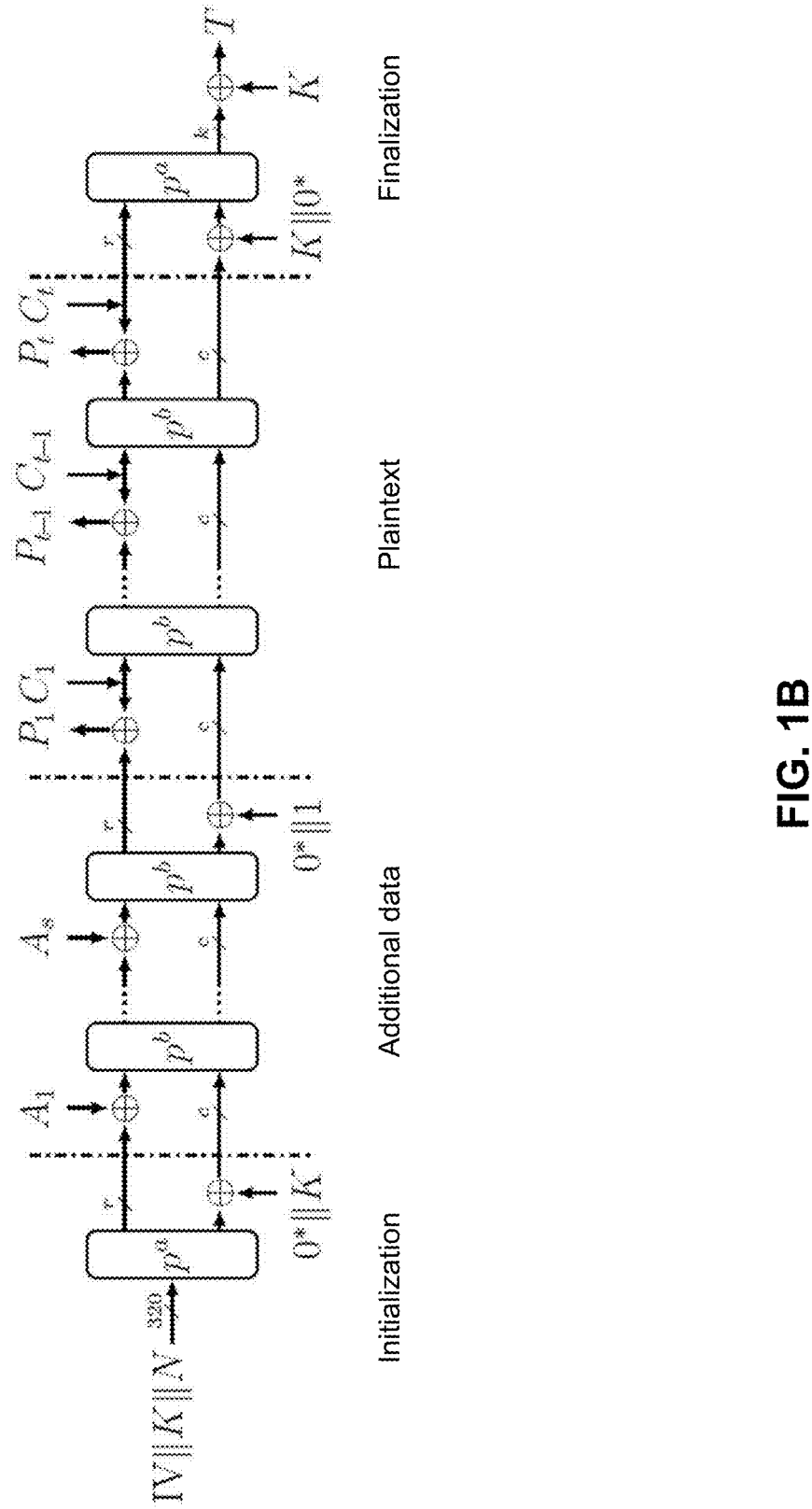

A mode of operation of Ascon is based on a duplex sponge mode, and uses a keyed initialization function and a keyed finalization function. The initialization/finalization permutations $p^a$ and the intermediate permutations $p^b$ operate on a state S of a particular size (e.g., 320 bits), with a rate of r bits and a capacity of c bits (e.g., c=320−r). The rate r and the capacity c parts of the state S may be denoted by $S_r$ and $S_c$, respectively. FIGS. 1A and 1B illustrate examples of the encryption operations and decryption operations, respectively, of an Ascon algorithm.

However, Ascon (or another type of lightweight a cryptographic algorithm) used to enable a security scheme such as AEAD, AE, or AO, may introduce non-negligible overhead in terms of latency. This latency may be significant in an application that utilizes a messaging protocol that uses relatively short messages, such as an application that uses controller area network (CAN) protocol (e.g., CAN secure (CANsec, which is applicable to standards such as CAN, CAN flexible data-rate (FD), CAN extra-long (XL), local interconnect network (LIN) protocol, or an Ethernet protocol such as 10base-T1S). Such latency may be particularly undesirable in, for example, an automotive application that has somewhat limited resources and relies on fast (e.g., real-time or near real-time) message exchange to ensure safe operation of a vehicle while requiring confidentiality and authenticity of data.

Some implementations described herein provide techniques and apparatuses for nonce preprocessing for a security scheme. In some implementations, a receiver computes a cryptographic state based on a freshness value, and computes a successive cryptographic state based on a successive freshness value. Here, the successive freshness value is based on a freshness modifier in combination with the freshness value. The receiver then stores the cryptographic state and the successive cryptographic state. The receiver then receives a message (after storing the cryptographic state and the successive cryptographic) and identifies either the cryptographic state or the successive cryptographic state based on the freshness value or the successive freshness value, respectively. The receiver then performs a security operation based on the identified cryptographic state.

Similarly, in some implementations, a transmitter computes a cryptographic state based on a freshness value, and computes a successive cryptographic state based on a successive freshness value using a freshness modifier in combination with the freshness value. The transmitter then stores the cryptographic state and the successive cryptographic state. The transmitter then receives an indication to generate a message (after storing the cryptographic state and the successive cryptographic state) and identifies either the cryptographic state or the successive cryptographic state based on the freshness value or the successive freshness value, respectively. The transmitter then generates the message based on the identified cryptographic state and transmits the message.

In this way, a device (e.g., a receiver or a transmitter) may pre-compute one or more cryptographic states associated with processing of a message transmitted according to a security scheme (e.g., AEAD, AE, AO, or the like). Here, pre-computation of the one or more cryptographic states reduces latency associated with generating or processing the message. Additional details are provided below.

Figure 2A:
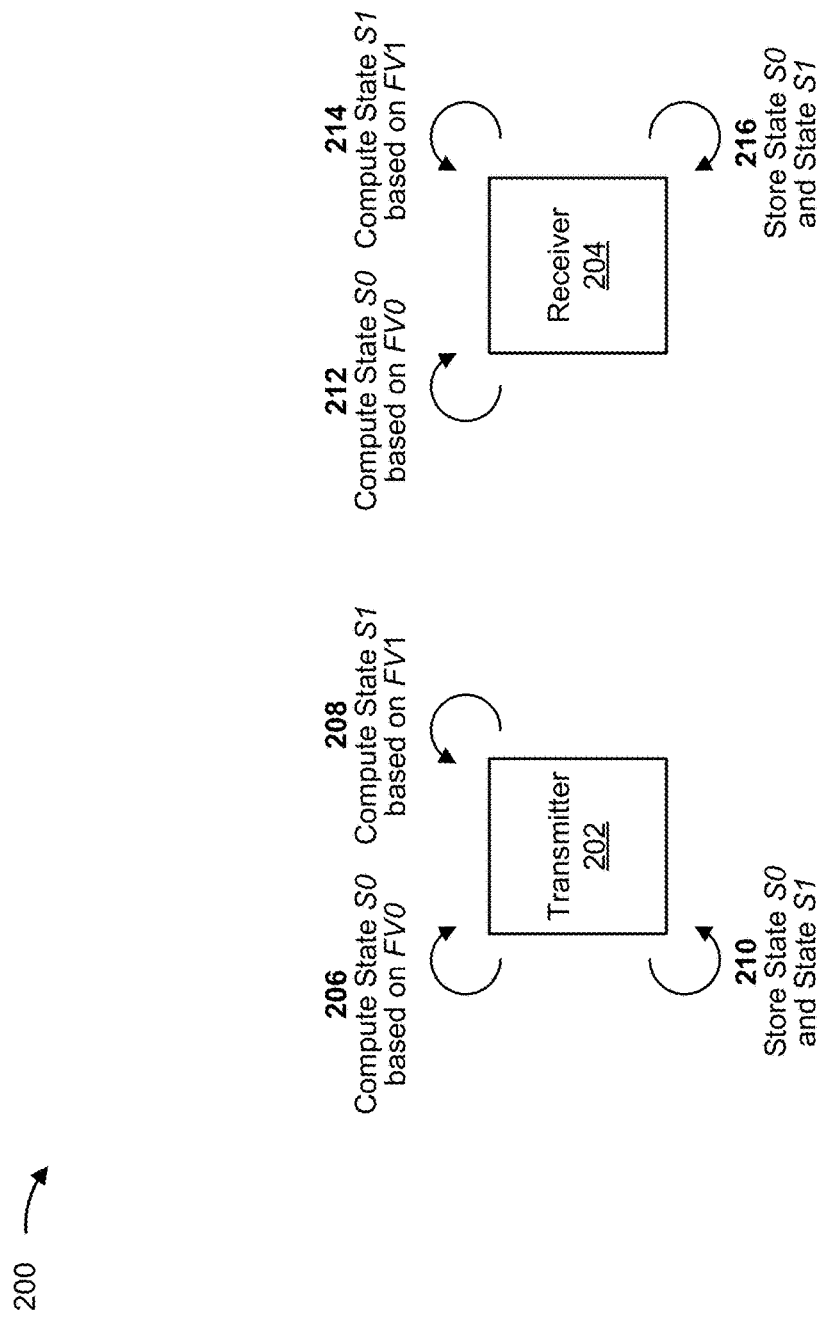
FIGS. 2A and 2B are diagrams of an example associated with nonce preprocessing for a security scheme as described herein.
Figure 2B:
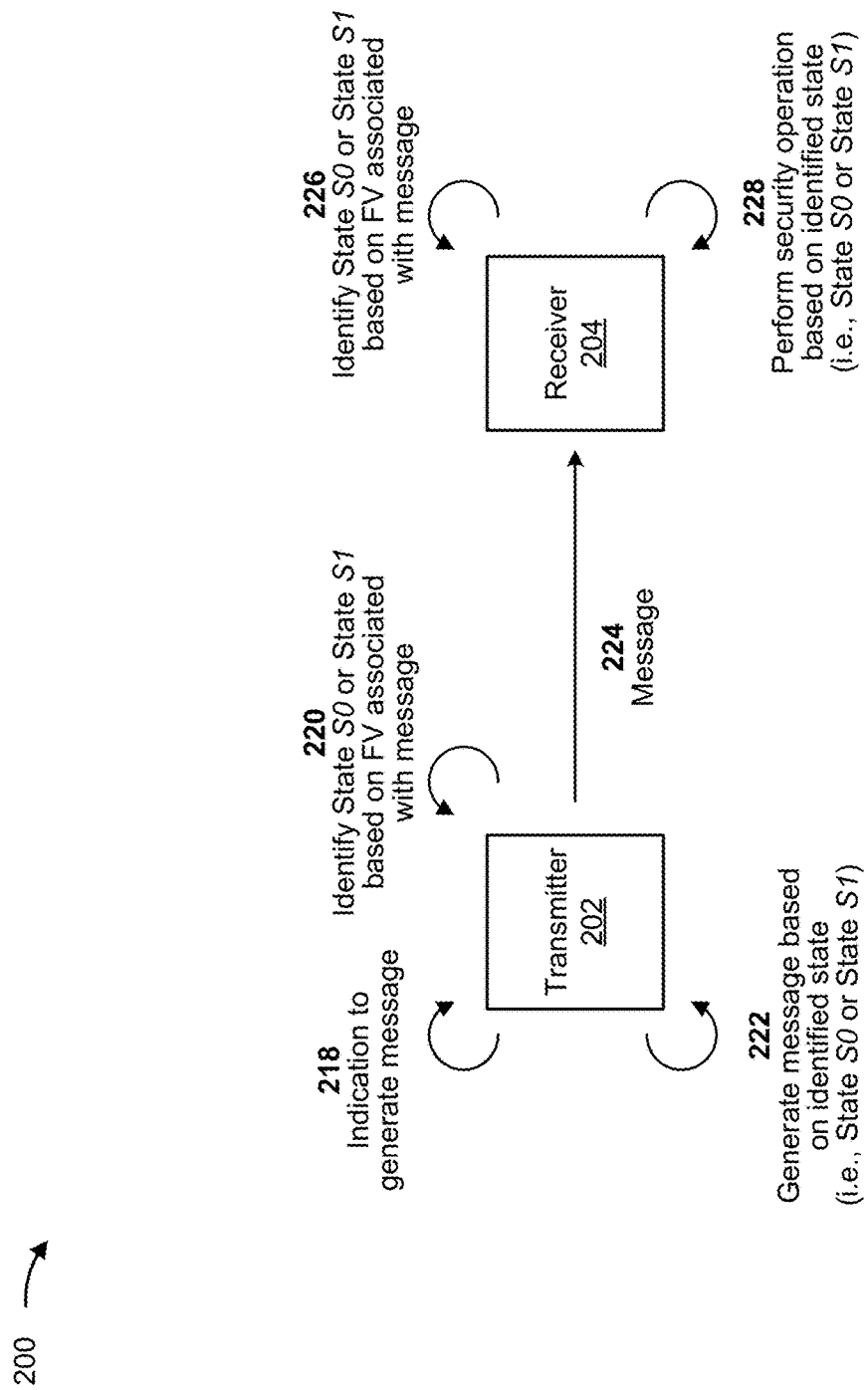

FIGS. 2A and 2B are diagrams of an example 200 associated with nonce preprocessing for a security scheme as described herein. As shown in FIGS. 2A and 2B, the example 200 includes a transmitter 202 and a receiver 204. In some implementations, the transmitter 202 and the receiver 204 may be network nodes in, for example, a bus-based communication system that connects a group of network nodes. In some implementations, the transmitter 202 and the receiver 204 may communicate with one another according to a message-based communication protocol. For example, the transmitter 202 may transmit a message as a frame of bits that are serially introduced into a bus and serially received by the receiver 204. Examples of protocols that may be used in a bus-based communication system 200 include CAN protocol, such as CANsec, CAN FD, CAN XL, or another type of protocol such as a LIN protocol or an Ethernet protocol (e.g., 10base-T1S).

In some implementations, the transmitter 202 and the receiver 204 are configured to communicate using an AEAD scheme (e.g., such that confidentiality and authenticity of a payload and authentication of additional data is provided for a message transmitted by the transmitter 202 and received by the receiver 204). Alternatively, the transmitter 202 and the receiver 204 may in some implementations be configured to communicate using an AE scheme (e.g., such that confidentiality and authenticity of a payload is provided for a message transmitted by the transmitter 202 and received by the receiver 204). Alternatively, the transmitter 202 and the receiver 204 may in some implementations be configured to communicate using an AO scheme (e.g., such that only authenticity of a payload is provided for a message transmitted by the transmitter 202 and received by the receiver 204).

In some implementations, the security scheme configured for the transmitter 202 and the receiver 204 may be realized using an Ascon algorithm (e.g., an algorithm that uses a sponge-based construction). That is, in some implementations, the transmitter 202 and the receiver 204 may be configured to use Ascon. Alternatively, the security scheme configured for the transmitter 202 and the receiver 204 may be realized using another type of algorithm, such as an advance encryption stated with Galois counter mode (AES- GCM). That is, in some implementations, the transmitter 202 and the receiver 204 may be configured to operate in an AES-GCM operation mode.

As shown in FIG. 2A at reference 206, the transmitter 202 may compute a cryptographic state S0 based on a freshness value FV0. A cryptographic state is a finite internal state of a cryptographic algorithm. That is, a cryptographic state is a state of the cryptographic algorithm at particular point of execution of the cryptographic algorithm. For example, a security scheme configured for the transmitter 202 and the receiver 204 may be realized using Ascon that uses a sponge-based construction. Here, a cryptographic state S of Ascon is an internal state of the algorithm at a given permutation of the sponge-based construction (e.g., a state after applying an initialization permutation $p^a$, a state after applying a set of intermediate permutations $p^b$ associated with processing additional data A, or the like).

A freshness value is a value that can be used in association with providing authentication and/or encryption for a message. In some implementations, freshness values in a sequence of freshness values are linked by a freshness modifier. For example, a freshness modifier (e.g., +1) may be applied to a first freshness value (e.g., FV0) to determine a second freshness value (e.g., FV1) that is successive to the first freshness value (e.g., FV1=FV0+1). Additional successive freshness values can be determined in a similar manner (e.g., FV2=FV1+1, and so on). As one example, a freshness value may be a counter value, such as a monotonic counter value, where each successive counter value is determined by applying an increment (or decrement) to a current counter value. In some implementations, a freshness value can be used to guarantee freshness of a message so as to provide protection from, for example, a replay attack or a man-in-the-middle attack.

In some implementations, freshness values are synchronized at the transmitter 202 and the receiver 204. That is, the transmitter 202 and the receiver 204 may be configured such that the same freshness value will be associated with a given message at both the transmitter 202 and the receiver 204. In some implementations, separate freshness values may be maintained for different channels (e.g., such that, at a given point in time, each channel is associated with its own freshness value). In some implementations, a freshness value manager (not shown) may be configured to manage synchronizing, updating, or refreshing of freshness values among the transmitter 202, the receiver 204, and/or other network nodes of the communication system. In some implementations, the freshness value manager may be configured on the transmitter 202, the receiver 204, or one or more other network nodes.

In some implementations, as noted above, a cryptographic state is computed based on a freshness value. As one example, as described above, inputs for applying an initialization permutation $p^a$ in an Ascon algorithm may include an initialization vector IV, a key K, and a nonce N. Here, the nonce N may be derived from a freshness value. For example, the nonce N may be a concatenation of a secure channel identifier (SCI) (e.g., an identifier for a channel in which a message is to be communicated) and a freshness value (e.g., a monotonic counter value). As a particular example, the nonce N may be a 96 bit nonce that comprises a 64 bit SCI and a 32 bit freshness value. A result of applying the initialization permutation $p^a$ is a cryptographic state of the Ascon algorithm after the initialization permutation $p^a$.

As another example, inputs for applying a first set of intermediate permutations $p^b$ associated with processing additional data A in an Ascon algorithm may include the additional data A and a result of applying the initialization permutation $p^a$ to the initialization vector IV, the key K and the nonce N. Here, as described above, the nonce N may be derived from a freshness value and an SCI. Thus, a result of applying the first set of intermediate permutations $p^b$ is a cryptographic state of the Ascon algorithm after the first set of intermediate permutations $p^b$.

With respect to reference 206, the transmitter 202 computes a first cryptographic state S0 based on a first freshness value FV0. In one example, in the case of an Ascon algorithm, the cryptographic state S0 may be a result of applying an initialization permutation $p^a$ to an initialization vector IV, a key K, and a nonce N derived at least in part from the freshness value FV0. As another example, the cryptographic state S0 may be a result of applying a first set of intermediate permutations $p^b$ to additional data A and a result of applying the initialization permutation $p^a$ to an initialization vector IV, a key K, and a nonce N derived at least part from the freshness value FV0.

As shown at reference 208, the transmitter 202 may compute a second cryptographic state S1 based on a second freshness value FV1. The transmitter 202 may compute the cryptographic state S1 in a manner similar to that in which the transmitter 202 computes the cryptographic state S0, but using the freshness value FV1 that is successive to the freshness value FV0. For example, the freshness value FV1 may be computed by applying a freshness modifier (e.g., +1) to the freshness value FV0.

In one example, in the case of Ascon, the cryptographic state S/may be a result of applying an initialization permutation $p^a$ to the initialization vector IV, the key K, and a nonce N derived at least in part from the freshness value FV1. As another example, the cryptographic state S1 may be a result of applying a first set of intermediate permutations $p^b$ to the additional data A and a result of applying the initialization permutation $p^a$ to the initialization vector IV, the key K, and the nonce N derived at least in part from the freshness value FV1.

Because the cryptographic state S0 is computed by the transmitter 202 based on the freshness value FV0 and the cryptographic state S1 is computed by the transmitter 202 based on the (successive) freshness value FV1, the cryptographic state S1 can be said to be successive to the cryptographic state S0. The transmitter 202 may compute additional successive cryptographic states in a similar manner. Thus, the transmitter 202 may in some implementations compute an ordered sequence of cryptographic states (e.g., cryptographic state S0, cryptographic state S1, cryptographic state S2, and so on) based on an ordered sequence of freshness values (e.g., freshness value FV0, freshness value FV1, freshness value FV2, and so on). Significantly, inputs based on which these cryptographic states are computed are deterministic or otherwise predictable. For example, the initialization vector IV, the key K, and the additional data A (e.g., header data) may be fixed or otherwise predictable by both the transmitter 202 and the receiver 204. Similarly, the nonce N may be derived from a freshness value (e.g., an incremented counter value) that is predictable by both the transmitter 202 and the receiver 204 and another item of fixed or predictable information, such as an SCI. The predictability or prior knowledge of these inputs therefore enables the transmitter 202 to precompute one or more cryptographic states. That is, the transmitter 202 may compute one or more cryptographic states prior to the transmitter 202 actually using a given cryptographic state in association with generating a message to be transmitted to the receiver 204.

In some implementations, the cryptographic state S0 and the cryptographic state S/may be associated with a single channel (e.g., a single secure channel associated with a particular SCI). In some implementations, the transmitter 202 may compute one or more cryptographic states for a given channel. In some implementations, the transmitter 202 may compute sets of one or more cryptographic states, where each set of one or more cryptographic states is associated with a respective channel. For example, the transmitter 202 may compute a first set of cryptographic states associated with a first channel (e.g., a first SCI), may compute a second set of cryptographic states associated with a second channel (e.g., a second SCI), and so on. In such a scenario, a separate freshness value should be maintained for each SCI.

As shown at reference 210, the transmitter 202 may store the cryptographic state S0 and the cryptographic state S1. That is, the transmitter 202 may store the sequence of cryptographic states that is precomputed by the transmitter 202 in the manner described above. In some implementations, the transmitter 202 may store a given cryptographic state such that the given cryptographic state is addressable by the freshness value associated with the cryptographic state, meaning that the stored cryptographic state can be retrieved (at a later time) based on the associated freshness value. In some implementations, the transmitter 202 may store a given cryptographic state such that the cryptographic state is addressable by a channel identifier (e.g., an SCI) associated with the cryptographic state. Additionally, or alternatively, the transmitter 202 may in some implementations store a given cryptographic state such that the cryptographic state is addressable by information associated with a message to be generated based on the stored cryptographic state. The information associated with the message may include, for example, a value of a first bit of the message (e.g., 0 or 1).

In some implementations, the receiver 204 may perform one or more operations similar to those as described with respect to the transmitter 202. That is, the receiver 204 may compute and store one or more cryptographic states in a manner similar to that described above with respect to the transmitter 202. For example, as shown at reference 212, the receiver 204 may compute the cryptographic state S0 based on the freshness value FV0. Notably, the cryptographic state S0 computed by the receiver 204 is the same cryptographic state S0 as computed by the transmitter 202. In one example, in the case of the Ascon algorithm, the cryptographic state S0 may be a result of applying an initialization permutation $p^a$ to an initialization vector IV, a key K, and a nonce N derived at least in part from the freshness value FV0. As another example, the cryptographic state S0 may be a result of applying a first set of intermediate permutations $p^b$ to additional data A and a result of applying the initialization permutation $p^a$ to an initialization vector IV, a key K, and a nonce N derived at least part from the freshness value FV0.

Similarly, as shown at reference 214, the receiver 204 may compute the cryptographic state S/based on a freshness value FV1. Notably, the cryptographic state S0 computed by the receiver 204 is the same cryptographic state S0 as computed by the transmitter 202. The receiver 204 may compute the cryptographic state S1 in a manner similar to that in which the receiver 204 computes the cryptographic state S0, but using the freshness value FV1 that is successive to the freshness value FV0. For example, the freshness value FV1 may be computed by applying a freshness modifier (e.g., +1) to the freshness value FV0.

In one example, in the case of Ascon, the cryptographic state S1 may be a result of applying an initialization permutation $p^a$ to the initialization vector IV, the key K, and a nonce N derived at least in part from the freshness value FV1. As another example, the cryptographic state S1 may be a result of applying a first set of intermediate permutations $p^b$ to the additional data A and a result of applying the initialization permutation $p^a$ to the initialization vector IV, the key K, and the nonce N derived at least in part from the freshness value FV1.

Notably, because the cryptographic state S0 is computed by the receiver 204 based on the freshness value FV0 and the cryptographic state S1 is computed by the receiver 204 based on the (successive) freshness value FV1, the cryptographic state S1 can be said to be successive to the cryptographic state S0. The receiver 204 may compute additional successive cryptographic states in a similar manner. Thus, the receiver 204 may in some implementations compute an ordered sequence of cryptographic states (e.g., cryptographic state S0, cryptographic state S1, cryptographic state S2, and so on) based on an ordered sequence of freshness values (e.g., freshness value FV0, freshness value FV1, freshness value FV2, and so on). As described above, inputs based on which these cryptographic states are computed are deterministic or otherwise predictable, which enables the receiver 204 to precompute one or more cryptographic states. That is, the receiver 204 may compute one or more cryptographic states prior to the receiver 204 actually using a given cryptographic state in association with processing a message received from the transmitter 202.

In some implementations, the cryptographic state S0 and the cryptographic state S/may be associated with a single channel (e.g., a single secure channel associated with a particular SCI). In some implementations, the receiver 204 may compute one or more cryptographic states for a given channel. In some implementations, the receiver 204 may compute sets of one or more cryptographic states, where each set of one or more cryptographic states is associated with a respective channel. For example, the receiver 204 may compute a first set of cryptographic states associated with a first channel (e.g., a first SCI), may compute a second set of cryptographic states associated with a second channel (e.g., a second SCI), and so on. In such a scenario, a separate freshness value should be maintained for each SCI.

Further, as shown at reference 216, the receiver 204 may store the cryptographic state S0 and the cryptographic state S1. That is, the receiver 204 may store the sequence of cryptographic states that is precomputed by the receiver 204 in the manner described above. In some implementations, the receiver 204 may store a given cryptographic state such that the given cryptographic state is addressable by the freshness value associated with the cryptographic state, meaning that the stored cryptographic state can be retrieved (at a later time) based on the associated freshness value. In some implementations, the receiver 204 may store a given cryptographic state such that the cryptographic state is addressable by a channel identifier (e.g., an SCI) associated with the cryptographic state. Additionally, or alternatively, the receiver 204 may in some implementations store a given cryptographic state such that the cryptographic state is addressable by information associated with a message expected to be processed based on the stored cryptographic state. The information associated with the message may include, for example, a value of a first bit of the message (e.g., 0 or 1).

As shown in FIG. 2B at reference 218, the transmitter 202 may, at a later time (i.e., after storing the one or more cryptographic states), receive an indication to generate a message after the cryptographic state S0 and the cryptographic state S1 are stored. For example, the transmitter 202 may receive an indication that a string of plaintext P is to be transmitted for reception by the receiver 204 over a particular channel (e.g., a channel associated with a particular SCI).

As shown at reference 220, the transmitter 202 may identify the cryptographic state S0 or the cryptographic state S1 based on the freshness value FV0 or the freshness value FV1. That is, the transmitter 202 may identify a stored cryptographic state applicable to the message to be generated by the transmitter 202. In some implementations, the transmitter 202 identifies the applicable stored cryptographic state based on a freshness value that is associated with the message. For example, as noted above, the transmitter 202 may maintain a freshness value counter associated with the particular channel. Here, the transmitter 202 may identify a current freshness value based on the freshness value counter. The transmitter 202 may then identify the applicable stored cryptographic state based on the current freshness value. For example, if the current freshness value is freshness value FV0, then the transmitter 202 may identify the cryptographic state S0 as the applicable stored cryptographic state to be used for generating the message. As another example, if the current freshness value is freshness value FV1, then the transmitter 202 may identify the cryptographic state S/as the applicable stored cryptographic state to be used for generating the message. As another example, the transmitter 202 may identify cryptographic state S0 or the cryptographic state S1 based on information associated with the message itself. As one particular example, the receiver 204 may be configured such that messages with a first bit having a first value (e.g., 0) are associated with freshness value FV0 and therefore map to cryptographic state S0, while messages with a first bit having a second value (e.g., 1) are associated with the freshness value FV1 and therefore map to cryptographic state S1.

As shown at reference 222, the transmitter 202 may generate the message based on the identified cryptographic state (e.g., the cryptographic state S0 or the cryptographic state S1). In some implementations, in association with generating the message, the transmitter 202 may use the identified cryptographic state as a starting cryptographic state for completing an execution of the associated cryptographic algorithm.

As one example, in the case of Ascon, the identified cryptographic state (e.g., cryptographic state S0, cryptographic state S1, or the like) may be a result of applying an initialization permutation $p^a$ to an initialization vector IV, a key K, and a nonce N derived at least in part from a particular freshness value (e.g., freshness value FV0, freshness value FV1, or the like). Here, the transmitter 202 may use the identified cryptographic state as a starting state for execution of a remaining portion of the Ascon algorithm. That is, in this example, the transmitter 202 may use the identified cryptographic state as an input associated with applying a first set of intermediate permutations $p^b$ associated with additional data A, a second set of intermediate permutations $p^b$ associated with plaintext P (to obtain ciphertext C), and a finalization permutation $p^a$ associated with generating a MAC T.

As another example, the identified cryptographic state may be a result of applying a first set of intermediate permutations $p^b$ to additional data A and a result of applying the initialization permutation $p^a$ to an initialization vector IV, a key K, and a nonce N derived at least part from the particular freshness value. Here, the transmitter 202 may use the identified cryptographic state as a starting state for execution of a remaining portion of the Ascon algorithm. That is, in this example, the transmitter 202 may use the identified cryptographic state as an input associated with applying a second set of intermediate permutations $p^b$ associated with plaintext P (to obtain ciphertext C) and a finalization permutation $p^a$ associated with generating a MAC T.

In some implementations, as described above, the security scheme implemented by the cryptographic algorithm may provide message authentication. Thus, the transmitter 202 when generating the message in some implementations may generate a MAC associated with authentication of the message. In some implementations, the security scheme implemented by the cryptographic algorithm may provide encryption (e.g., in addition to authentication). Thus, the transmitter 202 when generating the message in some implementations may encrypt the plaintext P to obtain ciphertext C in association with securing the message.

In this way, the transmitter 202 may utilize a precomputed cryptographic state in association with generating a message to be transmitted to the receiver 204. As a result, latency associated with transmitting the message of reception by the receiver 204 may be reduced. In some implementations, the transmitter 202 may discard a stored cryptographic state after using the stored cryptographic state in association with generating a message. For example, if the transmitter 202 uses the cryptographic state S0 in association with generating a message, then the transmitter 202 may discard (e.g., delete from memory) the cryptographic state S0.

In some implementations, the use of or discarding of a cryptographic state may trigger the transmitter 202 to compute one or more additional successive cryptographic states. For example, the transmitter 202 may store the cryptographic state S0 and the cryptographic state S1. Here, if the transmitter 202 uses the cryptographic state S0 in association with generating a message, then the transmitter 202 may discard the cryptographic state S0, which may trigger the transmitter 202 to compute and store cryptographic state S2 (i.e., a next successive cryptographic state that has yet to be computed by the transmitter 202).

As shown at reference 224, the transmitter 202 may transmit, and the receiver 204 may receive, the message. In some implementations, the message is transmitted and received over a communication bus and according to a communication protocol, such as CANsec. In this example, the receiver 204 receives the message after the receiver 204 stores the cryptographic state S0 and the cryptographic state S1.

As shown at reference 226, the receiver 204 may the receiver 204 may identify the cryptographic state S0 or the cryptographic state S1 based on the freshness value FV0 or the freshness value FV1. That is, the receiver 204 may identify a stored cryptographic state applicable to the message received from the transmitter 202. In some implementations, the receiver 204 identifies the applicable stored cryptographic state based on a freshness value that is associated with the message. For example, as noted above, the receiver 204 may maintain a freshness value counter associated with the particular channel. Here, the receiver 204 may identify a current freshness value based on the freshness value counter. The receiver 204 may then identify the applicable stored cryptographic state based on the current freshness value. For example, if the current freshness value is freshness value FV0, then the receiver 204 may identify the cryptographic state S0 as the applicable stored cryptographic state to be used in association with processing the message. As another example, if the current freshness value is freshness value FV1, then the receiver 204 may identify the cryptographic state S1 as the applicable stored cryptographic state to be used in association with processing the message. Alternatively, the freshness value may in some implementations be included in the message. That is, the transmitter 202 may in some implementations include the freshness value associated with the message in the message transmitted to the receiver 204. In such a scenario, the receiver 204 may identify the applicable stored cryptographic state based on the freshness value included in the message. As another example, the receiver 204 may identify cryptographic state S0 or the cryptographic state S/based on information associated with the message itself. As one particular example, the receiver 204 may be configured such that messages with a first bit having a first value (e.g., 0) are associated with freshness value FV0 and therefore map to cryptographic state S0, while messages with a first bit having a second value (e.g., 1) are associated with the freshness value FV1 and therefore map to cryptographic state S1.

As shown at reference 228, the receiver 204 may perform a security operation based on the identified cryptographic state (e.g., the cryptographic state S0 or the cryptographic state S1). In some implementations, in association with performing the security operation, the receiver 204 may use the identified cryptographic state as a starting cryptographic state for completing an execution of the associated cryptographic algorithm.

As one example, in the case of Ascon, the identified cryptographic state (e.g., cryptographic state S0, cryptographic state S7, or the like) may be a result of applying an initialization permutation $p^a$ to an initialization vector IV, a key K, and a nonce N derived at least in part from a particular freshness value (e.g., freshness value FV0, freshness value FV1, or the like). Here, the receiver 204 may use the identified cryptographic state as a starting state for execution of a remaining portion of the Ascon algorithm. That is, in this example, the receiver 204 may use the identified cryptographic state as an input associated with applying a first set of intermediate permutations $p^b$ associated with additional data A, a second set of intermediate permutations $p^b$ associated with ciphertext C (to obtain plaintext P), and a finalization permutation $p^a$ associated with generating a verification MAC T' (e.g., a computed MAC to be compared to a MAC received in the message).

As another example, the identified cryptographic state may be a result of applying a first set of intermediate permutations $p^b$ to additional data A and a result of applying the initialization permutation $p^a$ to an initialization vector IV, a key K, and a nonce N derived at least part from the particular freshness value. Here, the receiver 204 may use the identified cryptographic state as a starting state for execution of a remaining portion of the Ascon algorithm. That is, in this example, the receiver 204 may use the identified cryptographic state as an input associated with applying a second set of intermediate permutations $p^b$ associated with ciphertext C (to obtain plaintext P) and a finalization permutation $p^a$ associated with generating a verification MAC T'.

In some implementations, as described above, the security scheme implemented by the cryptographic algorithm may provide message authentication. Thus, the receiver 204 when performing the security operation in some implementations may perform authentication of the message based on a MAC T included in the message (and a verification MAC T' computed by the receiver 204). In some implementations, the security scheme implemented by the cryptographic algorithm may provide encryption (e.g., in addition to authentication). Thus, the receiver 204 when performing the security operation in some implementations may perform decryption of ciphertext C included in the message (to obtain the plaintext P).

In this way, the receiver 204 may utilize a precomputed cryptographic state in association with processing a message received from the transmitter 202. As a result, latency associated with processing the message may be reduced. In some implementations, the receiver 204 may discard a stored cryptographic state after using the stored cryptographic state in association with processing a message. For example, if the receiver 204 uses the cryptographic state S0 in association with generating a message, then the receiver 204 may discard (e.g., delete from memory) the cryptographic state S0.

In some implementations, the use of or discarding of a cryptographic state may trigger the receiver 204 to compute one or more additional successive cryptographic states. For example, the receiver 204 may store the cryptographic state S0 and the cryptographic state S1. Here, if the receiver 204 uses the cryptographic state S0 in association with processing a message, then the transmitter 202 may discard the cryptographic state S0, which may trigger the transmitter 202 to compute and store cryptographic state S2 (i.e., a next successive cryptographic state that has yet to be computed by the receiver 204).

The techniques described with respect to FIGS. 2A and 2B enable a device (e.g., a transmitter 202 and/or a receiver 204) to pre-compute one or more cryptographic states associated with processing of a message transmitted according to a security scheme, such as AEAD, AE, AO, or the like. As a result, latency associated with generating or processing the message is reduced.

As one example, the transmitter 202 and the receiver 204 may be configured to communicate using CAN protocol and Ascon with a=12 and b=6, where a given message is to carry 20 bytes of additional data A and a payload of 24 bytes. In one implementation, the precomputed cryptographic state may be a state after applying a first set of intermediate permutations $p^6$ to the additional data A (e.g., 3 blocks of additional data A) and a result of applying the initialization permutation $p^{12}$ to an initialization vector IV, a key K, and a nonce N derived at least part from a particular freshness value. Here, a portion of the sponge-based construction that is not precomputed includes a second set of intermediate permutations $p^6$ to be applied to 3 blocks of plaintext P or ciphertext C (depending on whether the device is a transmitter 202 or a receiver 204) and a finalization permutation $p^{12}$. Thus, precomputation of the cryptographic state enables the message to be processed approximately twice as fast as without precomputation of the cryptographic state.

As another example, the transmitter 202 and the receiver 204 may be configured to communicate using CAN FD protocol and Ascon with a=12 and b=6, where a given message is to carry 20 bytes of additional data A and a payload of 64 bytes payload. In one implementation, the precomputed cryptographic state may be a state after applying a first set of intermediate permutations $p^6$ to the additional data A (e.g., 3 blocks of additional data A) and a result of applying the initialization permutation $p^{12}$ to an initialization vector IV, a key K, and a nonce N derived at least part from a particular freshness value. Here, a portion of the sponge-based construction that is not precomputed includes a second set of intermediate permutations $p^6$ to be applied to 8 blocks of plaintext P or ciphertext C (depending on whether the device is a transmitter 202 or a receiver 204) and a finalization permutation $p^{12}$. Thus, precomputation of the cryptographic state enables the message to be processed approximately 1.5 times as fast as without precomputation of the cryptographic state.

As another example, the transmitter 202 and the receiver 204 may be configured to communicate using CAN FD protocol and a Ascon with a=12 and b=6, where a given message is to carry 20 bytes of additional data A and a payload of 1000 bytes payload. In one implementation, the precomputed cryptographic state may be a state after applying a first set of intermediate permutations $p^6$ to the additional data A (e.g., 3 blocks of additional data A) and a result of applying the initialization permutation $p^{12}$ to an initialization vector IV, a key K, and a nonce N derived at least part from a particular freshness value. Here, a portion of the sponge-based construction that is not precomputed includes a second set of intermediate permutations $p^6$ to be applied to 125 blocks of plaintext P or ciphertext C (depending on whether the device is a transmitter 202 or a receiver 204) and a finalization permutation $p^{12}$. Thus, precomputation of the cryptographic state enables the message to be processed approximately 4% faster than without precomputation of the cryptographic state.

As another example, the transmitter 202 and the receiver 204 may be configured to communicate using CAN XL protocol and Ascon with a=12 and b=6, where a given message is to carry 20 bytes of additional data A and a 2024 byte payload. In one implementation, the precomputed cryptographic state may be a state after applying a first set of intermediate permutations $p^6$ to the additional data A (e.g., 3 blocks of additional data A) and a result of applying the initialization permutation $p^{12}$ to an initialization vector IV, a key K, and a nonce N derived at least part from a particular freshness value. Here, a portion of the sponge-based construction that is not precomputed includes a second set of intermediate permutations $p^6$ to be applied to 253 blocks of plaintext P or ciphertext C (depending on whether the device is a transmitter 202 or a receiver 204) and a finalization permutation $p^{12}$. Thus, precomputation of the cryptographic state enables the message to be processed approximately 2% faster than without precomputation of the cryptographic state.

As indicated above, FIGS. 2A and 2B are provided as examples. Other examples may differ from what is described with regard to FIGS. 2A and 2B. For example, precomputation of one or more cryptographic states may in some implementations be performed by only the receiver 204 (i.e., the transmitter 202 may not be configured to precompute cryptographic states). As another example, precomputation of one or more cryptographic states may in some implementations be performed by only the transmitter 202 (i.e., the receiver 204 may not be configured to precompute cryptographic states).

Figure 3A:
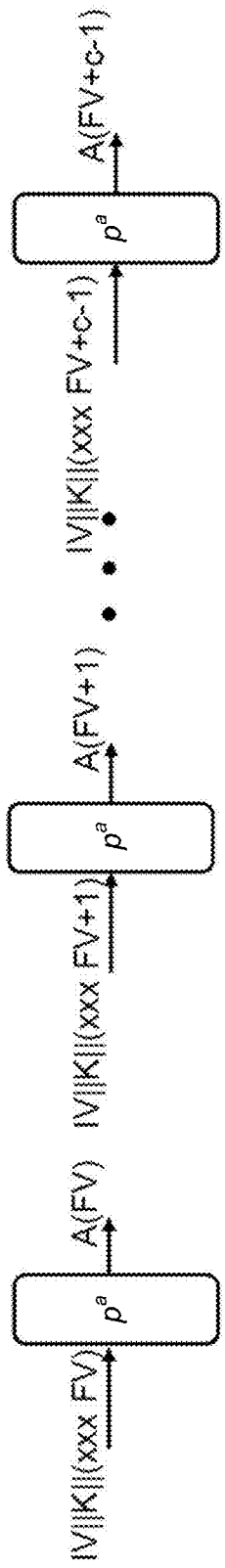
FIGS. 3A and 3B are diagrams illustrating examples associated with computation of a set of cryptographic states based on a set of freshness values as described herein.
Figure 3B:
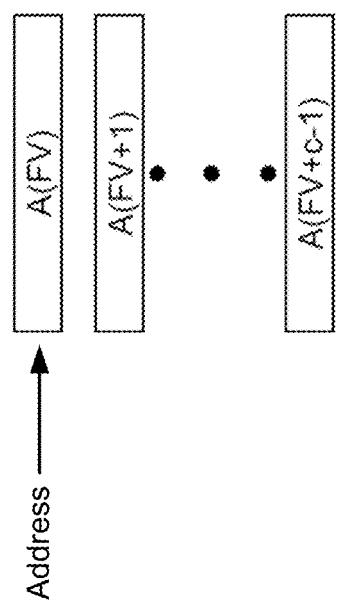

FIGS. 3A and 3B are diagrams illustrating examples associated with computation of a set of cryptographic states based on a set of freshness values as described herein.

In the example shown in FIGS. 3A and 3B, a set of c (c>0) cryptographic states are computed by, for example, a transmitter 202 or a receiver 204. In this example, each of the c cryptographic states is associated with a particular channel (e.g., a single SCI). Here, each of the c cryptographic states (e.g., A(FV), A(FV+1), ..., A(FV+c−1)) is computed by applying an initialization permutation $p^a$ in an Ascon algorithm to an initialization vector IV, a key K, and a respective nonce N, where each nonce N is derived from a respective freshness value (e.g., FV, FV+1, ..., FV+c−1) and an SCI (indicated as "xxx" in FIG. 3A). Here, a result of applying the initialization permutation $p^a$ to these inputs provides the set of c cryptographic states. As indicated by FIG. 3B, the set of c cryptographic states can then be stored and addressed for access at a later time.

As indicated above, FIGS. 3A and 3B are provided as examples. Other examples may differ from what is described with regard to FIGS. 3A and 3B.

Figure 4:
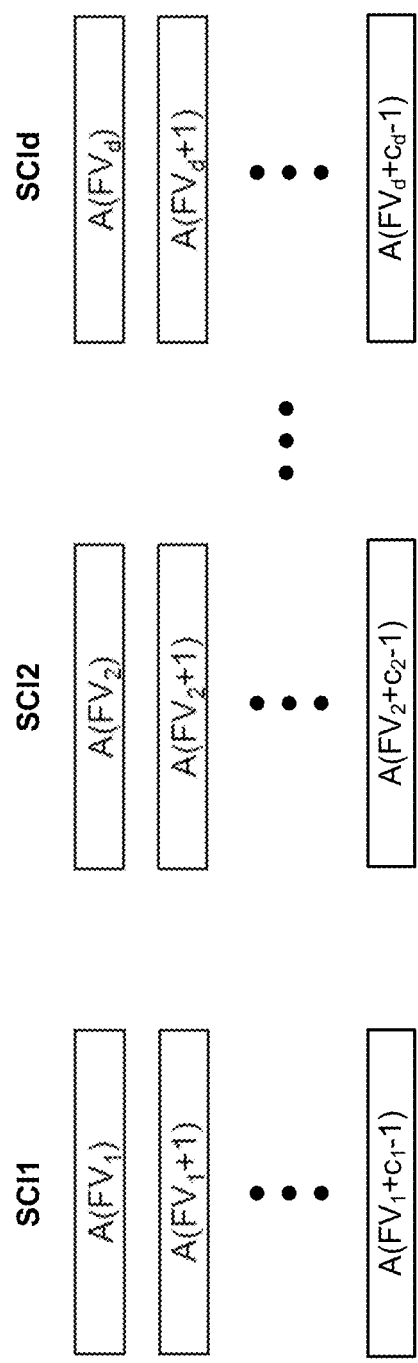
FIG. 4 is a diagram illustrating an example associated with computation of a multiple sets of cryptographic states based on multiple sets of freshness values as described herein.

FIG. 4 is a diagram illustrating an example associated with computation of a multiple sets of cryptographic states based on multiple sets of freshness values as described herein.

In the example shown in FIG. 4, a set of cryptographic states are computed by, for example, a transmitter 202 or a receiver 204 for each of d (d>1) SCIs (e.g., SCI1 through SCId). Here, each set of cryptographic states is associated with a different one of the d channels, and a separate freshness value is maintained for each channel. For example, with respect to SCI1, $c_1$ ($c_1$>0) cryptographic states (e.g., $A(FV_1)$, $A(FV_1+1)$, ..., $A(FV_1+c_1-1)$) are computed by applying an initialization permutation $p^a$ in an Ascon algorithm to an initialization vector IV, a first key $K_1$, and a respective nonce N, where each nonce N is derived from a respective freshness value (e.g., $FV_1$, $FV_1+1$, ..., $FV+c_1-1$) and SCI1. Here, a result of applying the initialization permutation $p^a$ to these inputs provides the set of $c_1$ cryptographic states. As another example, with respect to SCI2, $c_2$ ($c_2$>0) cryptographic states (e.g., $A(FV_2)$, $A(FV_2+1)$, ..., $A(FV_2+c_2-1)$) are computed by applying an initialization permutation $p^a$ in an Ascon algorithm to an initialization vector IV, a second key $K_2$, and a respective nonce N, where each nonce N is derived from a respective freshness value (e.g., $FV_2$, $FV_2+1$, ..., $FV+c_2-1$) and SCI2. Here, a result of applying the initialization permutation $p^a$ to these inputs provides the set of $c_2$ cryptographic states. As another example, with respect to SCId, $c_d$ ($c_d$>0) cryptographic states (e.g., $A(FV_d)$, $A(FV_d+1)$, ..., $A(FV_d+c_d-1)$) are computed by applying an initialization permutation $p^a$ in an Ascon algorithm to an initialization vector IV, a $d^{th}$ key $K_d$, and a respective nonce N, where each nonce N is derived from a respective freshness value (e.g., $FV_d$, $FV_d+1$, ..., $FV+c_d-1$) and SCId. Here, a result of applying the initialization permutation $p^a$ to these inputs provides the set of ca cryptographic states. Each of the sets of cryptographic states can then be stored and addressed for access at a later time.

As indicated above, FIG. 4 is provided as an example. Other examples may differ from what is described with regard to FIG. 4.

Figure 5A:
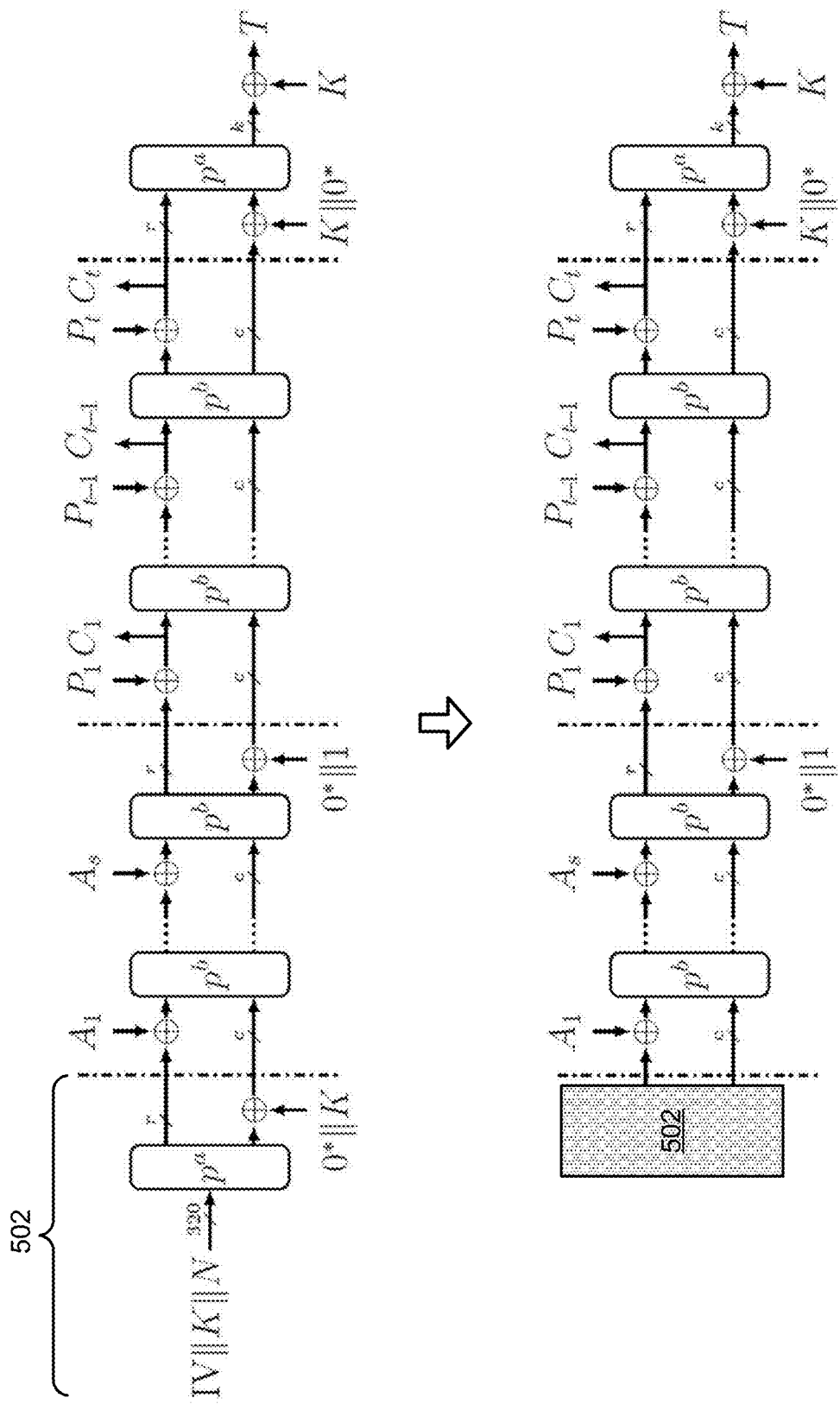
FIGS. 5A and 5B are diagrams illustrating examples associated with nonce preprocessing for Ascon as described herein.
Figure 5B:
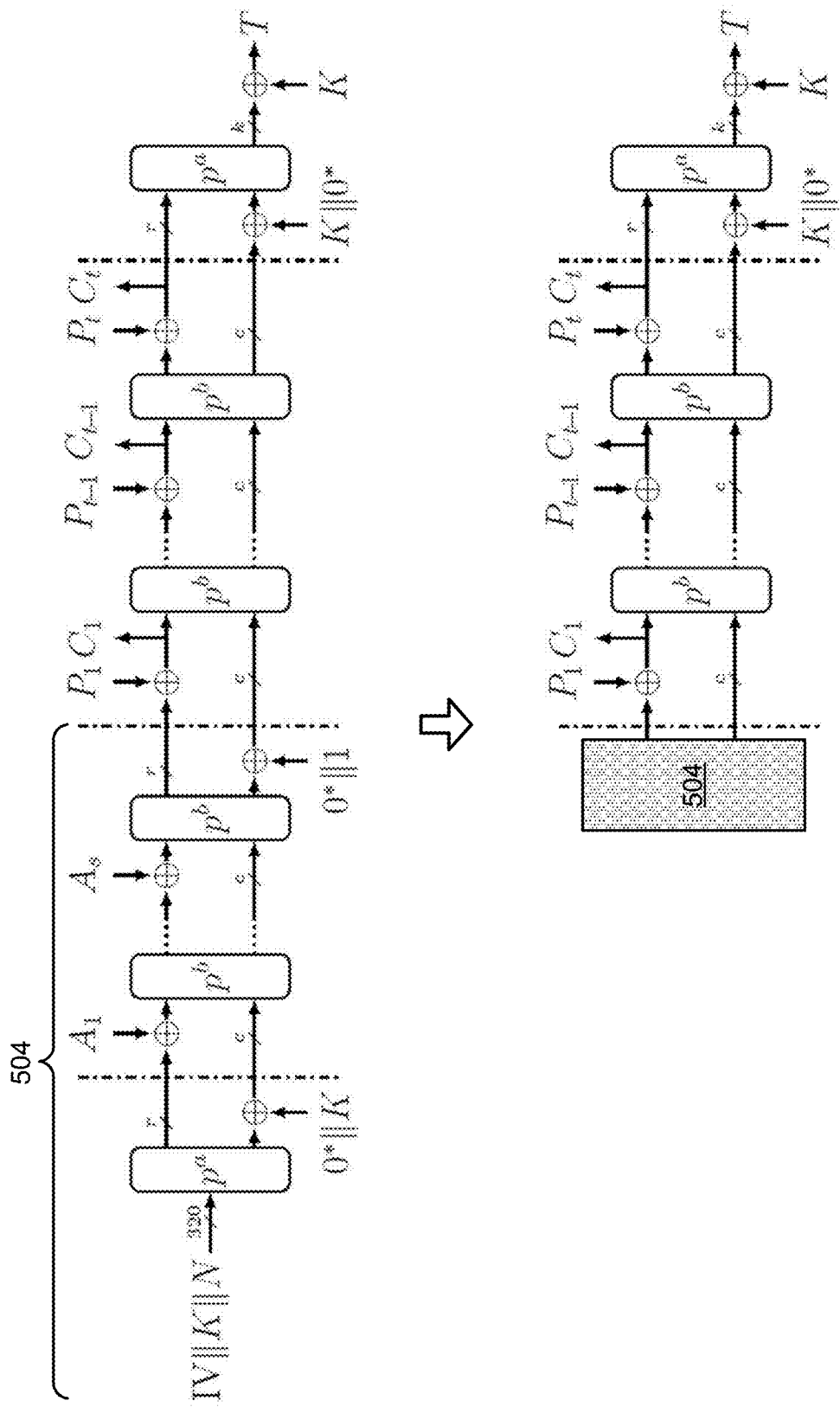

FIGS. 5A and 5B are diagrams illustrating examples associated with nonce preprocessing for Ascon as described herein.

FIG. 5A illustrates an example in which a cryptographic state 502 precomputed by a receiver 204 is a state after applying an initialization permutation $p^a$ to an initialization vector IV, a key K, and a nonce N derived at least in part from a particular freshness value. Here, the receiver 204 may store the cryptographic state 502 for use at a later time as a starting state for execution of a remaining portion of the Ascon algorithm in association the processing a message associated with the particular freshness value. That is, in this example, the receiver 204 may at a later time use the cryptographic state 502 as an input associated with applying a first set of intermediate permutations $p^b$ associated with additional data A (e.g., t blocks of additional data A), a second set of intermediate permutations $p^b$ associated with t blocks of ciphertext C (to obtain t blocks of plaintext P), and a finalization permutation $p^a$ associated with generating a verification MAC T'.

FIG. 5B illustrates an example in which a cryptographic state 504 precomputed by a receiver 204 is a state after applying a first set of intermediate permutations $p^b$ to additional data A (e.g., t blocks of additional data A) and a result of applying the initialization permutation $p^a$ to an initialization vector IV, a key K, and a nonce N derived at least part from a particular freshness value. Here, the receiver 204 may store the cryptographic state 504 as a starting state for execution of a remaining portion of the Ascon algorithm in association with processing a message associated with the particular freshness value. That is, in this example, the receiver 204 may at a later time use the cryptographic state 504 as an input associated with applying a second set of intermediate permutations $p^b$ associated with t blocks of ciphertext C (to obtain t blocks of plaintext P) and a finalization permutation $p^a$ associated with generating a verification MAC T'.

As indicated above, FIGS. 5A and 5B are provided as examples. Other examples may differ from what is described with regard to FIGS. 5A and 5B.

Notably, while examples associated with nonce preprocessing described herein are described with respect to the use of Ascon, the use of Ascon is one example implementation for nonce preprocessing, and the techniques and apparatuses described herein can be applied to any sponge-based construction.

Figure 6:
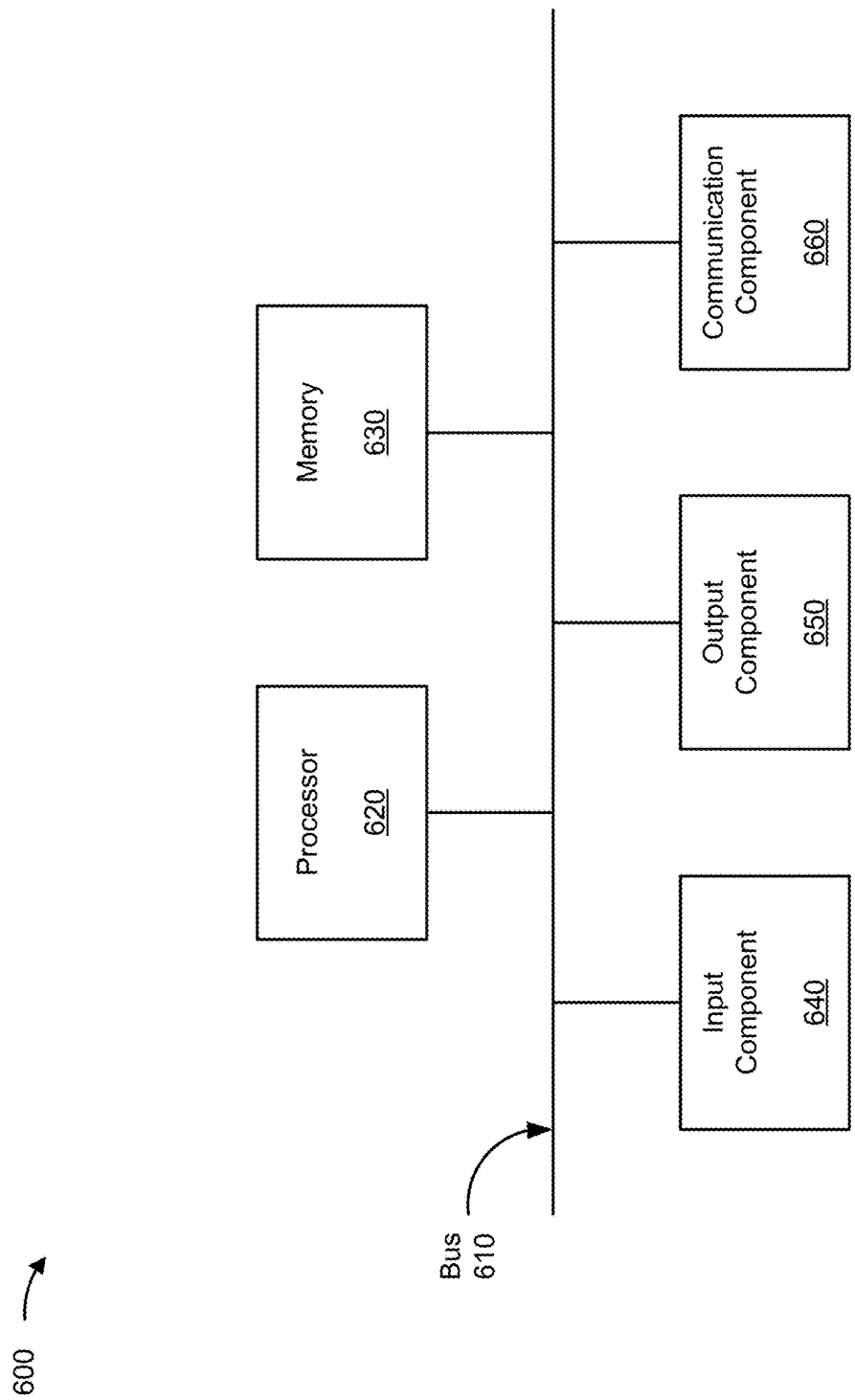
FIG. 6 is a diagram of example components of a device capable of performing nonce preprocessing for a security scheme as described herein.

FIG. 6 is a diagram of example components of a device 600 capable of performing nonce preprocessing for a security scheme as described herein. The device 600 may correspond to transmitter 202 and/or receiver 204. In some implementations, the transmitter 202 and/or the receiver 204 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
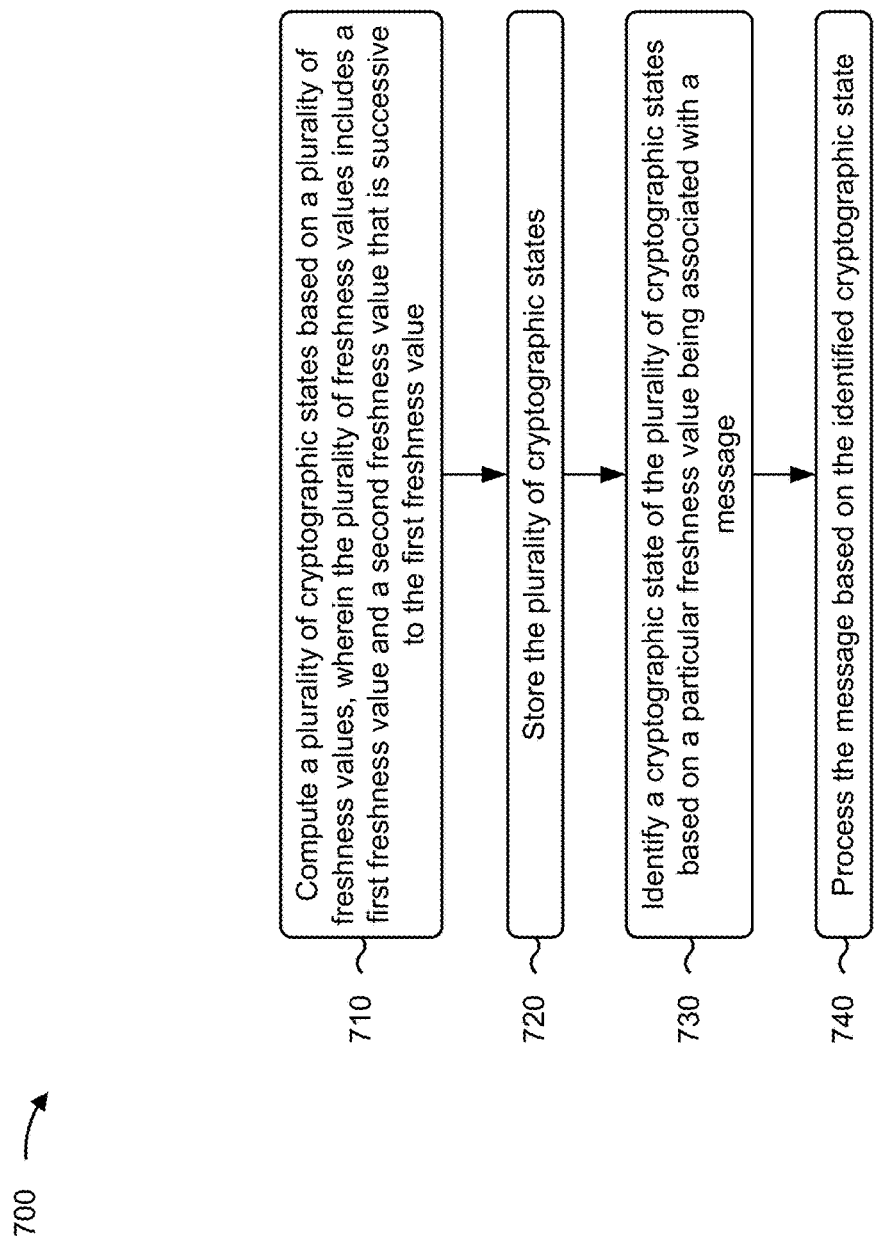
FIG. 7 is a flowchart of an example process associated with nonce preprocessing for a security scheme as described herein.

FIG. 7 is a flowchart of an example process 700 associated with nonce preprocessing for a security scheme as described herein. In some implementations, one or more process blocks of FIG. 7 are performed by a transmitter (e.g., a transmitter 202) or a receiver (e.g., a receiver 204). Additionally, or alternatively, one or more process blocks of FIG. 7 may be performed by one or more components of a device 600, such as processor 620, memory 630, input component 640, output component 650, and/or communication component 670.

As shown in FIG. 7, process 700 may include computing a plurality of cryptographic states based on a plurality of freshness values, wherein the plurality of freshness values includes a first freshness value and a second freshness value that is successive to the first freshness value (block 710). For example, the device (e.g., a transmitter 202 or a receiver 204) may compute a plurality of cryptographic states based on a plurality of freshness values, wherein the plurality of freshness values includes a first freshness value and a second freshness value that is successive to the first freshness value, as described above.

As further shown in FIG. 7, process 700 may include storing the plurality of cryptographic states (block 720). For example, the device may store the plurality of cryptographic states, as described above.

As further shown in FIG. 7, process 700 may include identifying a cryptographic state of the plurality of cryptographic states based on a particular freshness value being associated with a message (block 730). For example, the device may identify a cryptographic state of the plurality of cryptographic states based on a particular freshness value being associated with a message, as described above.

As further shown in FIG. 7, process 700 may include processing the message based on the identified cryptographic state (block 740). For example, the device may process the message based on the identified cryptographic state, as described above.

Process 700 may include additional implementations, such as any single implementation or any combination of implementations described below and/or in connection with one or more other processes described elsewhere herein.

In a first implementation, the plurality of cryptographic states is associated with a first communication channel and a first secret key, and process 700 further comprises computing a second plurality of cryptographic states based on a second plurality of freshness values, wherein the second plurality of cryptographic states is associated with a second communication channel and a second secret key, and storing the second plurality of cryptographic states.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more processors and one or more memories to cause the device to:
compute a cryptographic state based on a freshness value and a communication channel identifier, the communication channel identifier indicating a communication channel in which a message is to be communicated;
compute a successive cryptographic state based on a successive freshness value and the communication channel identifier, the successive freshness value being based on a freshness modifier in combination with the freshness value;
store the cryptographic state and the successive cryptographic state;
receive the message after the cryptographic state and the successive cryptographic state are stored;
identify the cryptographic state or the successive cryptographic state based on the freshness value or the successive freshness value; and
perform a security operation based on the cryptographic state or the successive cryptographic state.

2. The device of claim 1,
wherein the security operation comprises authentication of the message based on a message authentication code included in the message.

3. The device of claim 2,
wherein the security operation comprises decryption of ciphertext included in the message.

4. The device of claim 1,
wherein the successive cryptographic state is computed based on a secret key and a nonce associated with the successive freshness value.

5. The device of claim 1,
wherein the successive cryptographic state is computed based on a secret key, a nonce associated with the successive freshness value, and additional data.

6. The device of claim 1,
wherein the cryptographic state and the successive cryptographic state are associated with a single communication channel.

7. The device of claim 1,
wherein the cryptographic state and the successive cryptographic state are associated with a first communication channel and a first secret key, and the one or more processors and the one or more memories further cause the device to:
compute a second cryptographic state based on a second freshness value,
wherein the second cryptographic state is associated with a second communication channel and a second secret key;
compute a second successive cryptographic state based on a second successive freshness value, the second successive freshness value being based on the freshness modifier in combination with the second freshness value,
wherein the second successive cryptographic state is associated with the second communication channel and the second secret key; and
store the second cryptographic state and the second successive cryptographic state.

8. The device of claim 1,
wherein the cryptographic state or the successive cryptographic state is based on information that identifies a communication channel associated with the message.

9. The device of claim 1,
wherein the one or more processors and the one or more memories further cause the device to perform the security operation using a sponge-based construction.

10. The device of claim 1,
wherein the successive cryptographic state is computed based on a nonce, the nonce comprising a concatenation of the successive freshness value and the communication channel identifier.

11. A device, comprising:
one or more processors and one or more memories to cause the device to:
compute a cryptographic state based on a freshness value and a communication channel identifier, the communication channel identifier indicating a communication channel in which a message is to be communicated;
compute a successive cryptographic state based on a successive freshness value and the communication channel identifier using a freshness modifier in combination with the freshness value;
store the cryptographic state and the successive cryptographic state;
receive an indication to generate the message after the cryptographic state and the successive cryptographic state are stored;
identify the cryptographic state or the successive cryptographic state based on the freshness value or the successive freshness value;
generate the message based on the cryptographic state or the successive cryptographic state; and
transmit the message.

12. The device of claim 11,
wherein the one or more processors and the one or more memories, when generating the message, further cause the device to generate a message authentication code associated with authentication of the message by a receiver.

13. The device of claim 12,
wherein the one or more processors and the one or more memories, when generating the message, further cause the device to encrypt plaintext to obtain ciphertext in association with securing the message.

14. The device of claim 11,
wherein the successive cryptographic state is computed based on a secret key and a nonce associated with the successive freshness value.

15. The device of claim 11,
wherein the successive cryptographic state is computed based on a secret key, a nonce associated with the successive freshness value, and additional data.

16. The device of claim 11,
wherein the cryptographic state and the successive cryptographic state are associated with a single communication channel.

17. The device of claim 11,
wherein the cryptographic state and the successive cryptographic state are associated with a first communication channel and a first secret key, and the one or more processors and the one or more memories further cause the device to:
compute a second cryptographic state based on a second freshness value,
wherein the second cryptographic state is associated with a second communication channel and a second secret key;
compute a second successive cryptographic state based on a second successive freshness value, the second successive freshness value being based on the freshness modifier in combination with the second freshness value,
wherein the second successive cryptographic state is associated with the second communication channel and the second secret key; and
store the second cryptographic state and the second successive cryptographic state.

18. The device of claim 11,
wherein the one or more processors and the one or more memories further cause the device to generate the message using a sponge-based construction.

19. A method, comprising:
computing, by a device, a plurality of cryptographic states based on a plurality of freshness values and a communication channel identifier, the communication channel identifier indicating a communication channel in which a message is communicated,
wherein the plurality of freshness values includes a first freshness value and a second freshness value that is successive to the first freshness value;
storing, by the device, the plurality of cryptographic states;
identifying, by the device, a cryptographic state of the plurality of cryptographic states based on a particular freshness value being associated with the message; and
processing, by the device, the message based on the identified cryptographic state and the communication channel identifier.

20. The method of claim 19,
wherein the plurality of cryptographic states is associated with a first communication channel and a first secret key, and the method further comprises:
computing a second plurality of cryptographic states based on a second plurality of freshness values,
wherein the second plurality of cryptographic states is associated with a second communication channel and a second secret key; and
storing the second plurality of cryptographic states.

* * * * *